US012671481B2

(12) United States Patent
Yao et al.

(10) Patent No.: US 12,671,481 B2
(45) Date of Patent: Jun. 30, 2026

(54) METHOD OF UPLINK TRANSMISSION

(71) Applicant: ZTE Corporation, Guangdong (CN)

(72) Inventors: Ke Yao, Shenzhen (CN); Bo Gao, Shenzhen (CN); Minqiang Zou, Shenzhen (CN); Yang Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 308 days.

(21) Appl. No.: 18/532,765

(22) Filed: Dec. 7, 2023

(65) Prior Publication Data

US 2024/0154677 A1 May 9, 2024

Related U.S. Application Data

(63) Continuation of application No. PCT/CN2022/078986, filed on Mar. 3, 2022.

(51) Int. Cl.
*H04B 7/06* (2006.01)
(52) U.S. Cl.
CPC ......... *H04B 7/0639* (2013.01); *H04B 7/0623* (2013.01); *H04B 7/063* (2013.01)
(58) Field of Classification Search
CPC .... H04B 7/0639; H04B 7/0623; H04B 7/063; H04B 7/0456; H04B 7/0486; H04L 27/2601
See application file for complete search history.

(56) References Cited

U.S. PATENT DOCUMENTS

| | | | |
|---|---|---|---|
| 2011/0032839 A1* | 2/2011 | Chen .................... | H04B 7/0417 370/252 |
| 2014/0269395 A1* | 9/2014 | Chen .................... | H04B 7/0478 370/252 |
| 2015/0030092 A1 | 1/2015 | Krishnamurthy | |
| 2019/0036580 A1 | 1/2019 | Zhang et al. | |
| 2020/0274585 A1 | 8/2020 | Huang et al. | |

FOREIGN PATENT DOCUMENTS

| | | |
|---|---|---|
| CN | 102868497 | 1/2013 |
| CN | 110324070 | 10/2019 |
| CN | 110535496 | 12/2019 |
| WO | 2017/167184 | 10/2017 |

OTHER PUBLICATIONS

Extended European Search Report for EP Appl. No 22929314.7, Report dated Jun. 26, 2024, 11 pages.

(Continued)

*Primary Examiner* — Kyaw Z Soe
(74) *Attorney, Agent, or Firm* — Perkins Coie LLP

(57) ABSTRACT

Disclosed are methods apparatuses and computer readable media. In one aspect, a method includes receiving a rank indication or a first index associated with the rank indication, wherein the rank indication is used to determine G rank values, wherein G is a positive integer, and receiving a matrix indication or a second index associated with the matrix indication, wherein the matrix indication is used to determine a basic matrix. The method further includes determining a precoding matrix for a transmission according to at least one of the G rank values or the basic matrix.

20 Claims, 13 Drawing Sheets

2Tx:

(a) Non-coherent (b) Coherent

4Tx:

(a) Non-coherent (b) Partial coherent (c) Coherent

(56)　　　　References Cited

OTHER PUBLICATIONS

Nokia et al. "Enhancement on CSI measurement and reporting" GPP TSG RAN WG1 Meeting #103-e e-Meeting, Oct. 26-Nov. 13, 2020, R1-2008909, 21 pages.

International Search Report and Written Opinion for PCT/CN2022/078986, filed Mar. 3, 2022, Report dated Oct. 13, 2022, 9 pages.

Qualcomm Incorporated "Enhancements on Multi-TRP for PDCCH, PUCCH and PUSCH" 3GPP TSG-RAN WG1 Meeting #105-bis-e R1-2104655, e-Meeting, May 10-May 27, 2021, 17 pages.

Huawei "TP on stage 2 description for Rel-17 efficient SCell activation of NR CA" 3GPP TSG RAN WG1 Meeting #108-e R1-2202465, e-Meeting, Feb. 21-Mar. 3, 2022, 1 page.

Huawei, et al "Discussion on LS on Stage 2 description for Coverage Enhancement" 3GPP TSG RAN WG1 Meeting #108-e R1-2202463, E-meeting, Feb. 21-Mar. 3, 2021, 5 pages.

Qualcomm Incorporated "Summary of [108-e-R16-MIMO-03] NZC partitioning and PMI indexing correction for eT2 CSI" 3GPP TSG RAN WG1 #108-e R1-2202803, e-Meeting, Feb. 21-Mar. 2, 2022, 7 pages.

ZTE "Discussion on additional enhancement for NR-NTN" 3GPP TSG RAN WG1 #107-e R1-2111661 e-Meeting, Nov. 11-19, 2021, 6 pages.

Panasonic "Beam management and polarization signaling for NTN" 3GPP TSG-RAN WG1 #107e R1-2111706 eMeeting, Nov. 11-19, 2021, 4 pages.

NEC "Discussion on remaining issues on multi-beam operation" 3GPP TSG RAN WG1 #108-e R1-2201896, e-Meeting, Feb. 21-Mar. 3, 2022 16 pages.

Huawei, et al. "Views on UE capability for supporting single DCI transmission schemes for multi-TRP" 3GPP TSG RAN WG1 Meeting #108-e R1-2202468, e-Meeting, Feb. 21-Mar. 3, 2022, 2 pages.

CATT "Enhancements on PUCCH and PUSCH" 3GPP TSG RAN WG1 #105-e R1-2104485, e-Meeting, May 19-27, 2021, 15 pages.

Office Action for Canadian Appl. No. 3,222,555, Office Action dated Feb. 7, 2025, 5 pages.

* cited by examiner

2Tx :
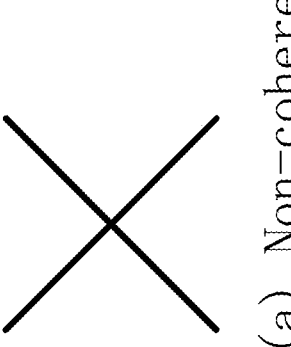
(a) Non-coherent
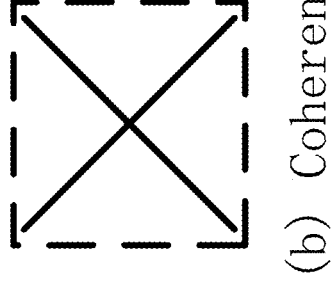
(b) Coherent
FIG. 1A

6Tx:
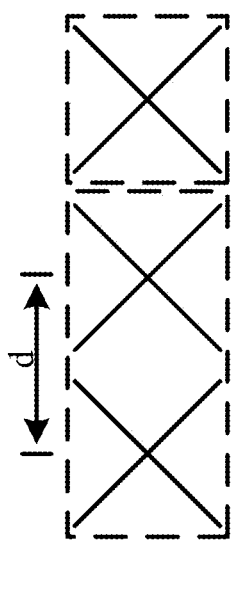
(a) Non-coherent
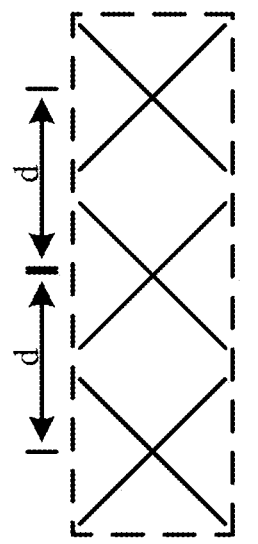
(b) Partial coherent
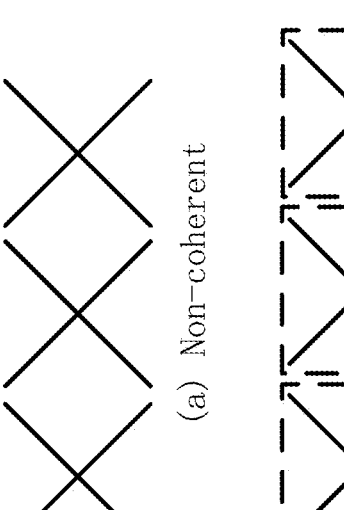
(c) full Coherent
FIG. 1C

FIG. 4

1st port group

| NZ | 0 | NZ | 0 |
|----|---|----|---|
| L1 |   |    |   |

2nd port group

| NZ | 0 | NZ |
|----|---|----|
| 0 | NZ | 0 |
| NZ | 0 | NZ |
| 0 | NZ | 0 |
| L1 | L2 | L3 |

FIG. 5

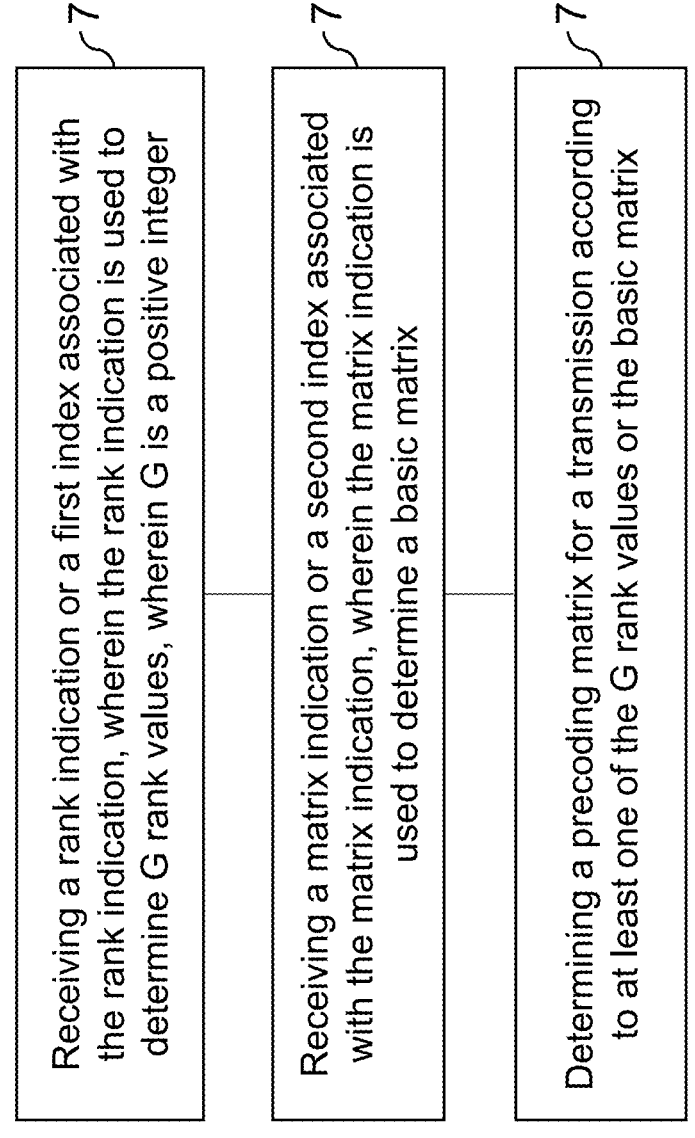

700

710 Receiving a rank indication or a first index associated with the rank indication, wherein the rank indication is used to determine G rank values, wherein G is a positive integer 720 Receiving a matrix indication or a second index associated with the matrix indication, wherein the matrix indication is used to determine a basic matrix 730 Determining a precoding matrix for a transmission according to at least one of the G rank values or the basic matrix

FIG. 7

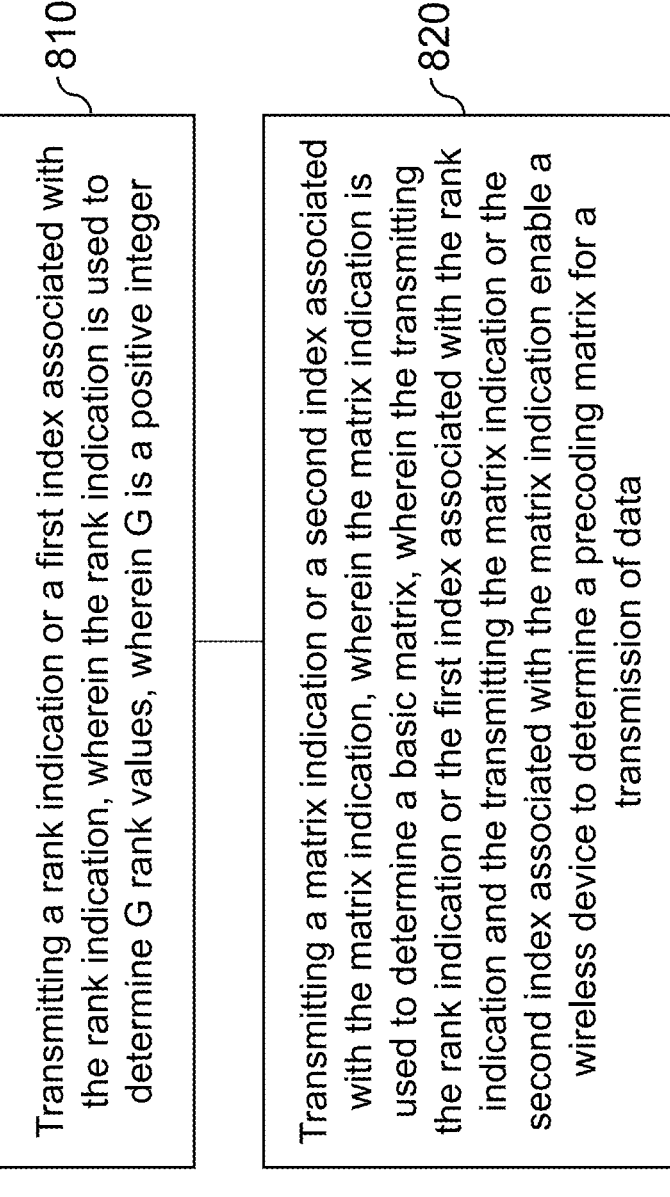

800

810

Transmitting a rank indication or a first index associated with the rank indication, wherein the rank indication is used to determine G rank values, wherein G is a positive integer

820

Transmitting a matrix indication or a second index associated with the matrix indication, wherein the matrix indication is used to determine a basic matrix, wherein the transmitting the rank indication or the first index associated with the rank indication and the transmitting the matrix indication or the second index associated with the matrix indication enable a wireless device to determine a precoding matrix for a transmission of data

METHOD OF UPLINK TRANSMISSION

CROSS-REFERENCE TO RELATED APPLICATION

This application is a continuation and claims priority to International Application No. PCT/CN2022/078986, filed on Mar. 3, 2022, the disclosure of which is hereby incorporated by reference herein in its entirety.

TECHNICAL FIELD

This patent disclosure is directed to wireless communications.

BACKGROUND

One of the features of the new radio (NR) technology of fifth generation (5G) mobile communication systems is the support of high frequency bands. High frequency bands have abundant frequency domain resources, but wireless signals in high frequency bands attenuate quickly and resulting in smaller coverage areas. Thus, transmitting signals in a beam mode is able to concentrate energy in a relatively small spatial range and to improve the coverage of the wireless signals in the high frequency bands.

SUMMARY

In various aspects methods, apparatuses, and computer readable media are disclosed. In one aspect, a method is disclosed. The method includes receiving a rank indication or a first index associated with the rank indication, wherein the rank indication is used to determine G rank values, wherein G is a positive integer, and receiving a matrix indication or a second index associated with the matrix indication, wherein the matrix indication is used to determine a basic matrix. The method further includes determining a precoding matrix for a transmission according to at least one of the G rank values or the basic matrix.

In another aspect, a method includes transmitting a rank indication or a first index associated with the rank indication, wherein the rank indication is used to determine G rank values, wherein G is a positive integer. The method further includes transmitting a matrix indication or a second index associated with the matrix indication, wherein the matrix indication is used to determine a basic matrix, wherein the transmitting the rank indication or the first index associated with the rank indication and the transmitting the matrix indication or the second index associated with the matrix indication enable a wireless device to determine a precoding matrix for a transmission of data.

BRIEF DESCRIPTION OF THE DRAWINGS

FIG. 1A shows a representation of 2 Tx for coherent and non-coherent transmissions.

FIG. 1C shows a representation of 6 Tx for full coherent, partial coherent, and non-coherent transmissions.

FIG. 4 shows another example pattern for 4 ports.

FIG. 5 shows an example with 2 port groups with 1 layer and 3 layers respectively, a pattern with even indexed half and a hopped pattern for the layers except layer 1.

FIG. 7 depicts a process, in accordance with some example embodiments.

FIG. 8 depicts a process, in accordance with some example embodiments.

DETAILED DESCRIPTION

In the following description, headings may be used to improve clarity without limiting the combinations of the various disclosed features.

A physical uplink shared channel (PUSCH) transmission is scheduled based on a sounding reference signal (SRS) transmission. SRS resources are configured in a SRS resource set with the use of a codebook (or a non-codebook to a wireless device) by a network or next generation node B (gNB) via radio resource control (RRC) signaling. In some communications standards, 8 transmit (Tx) (antenna ports) are not supported for uplink (UL) transmissions. Schemes for generating a precoding matrix or codebook, rank and transmit precoding matrix index (TPMI) indication needs to be determined for 8 Tx. Disclosed are techniques for determining or generating codebooks for 6 Tx and 8Tx for partial coherent and non-coherent transmissions.

UE Antenna Architecture

Similar to some downlink (DL) codebook architectures for wireless device Tx antenna architectures, coherent Tx antenna ports can be arranged as cross polarized, e.g., 2 Tx, 4Tx, 6Tx, 8Tx. Tx antenna architectures with non-coherent, partial coherent and full coherent capability are shown in the following figures. The dashed boxes mean that the marked Tx(s) are coherent. FIG. 1A shows a representation of 2 Tx for coherent and non-coherent transmissions.

Figure 1B:
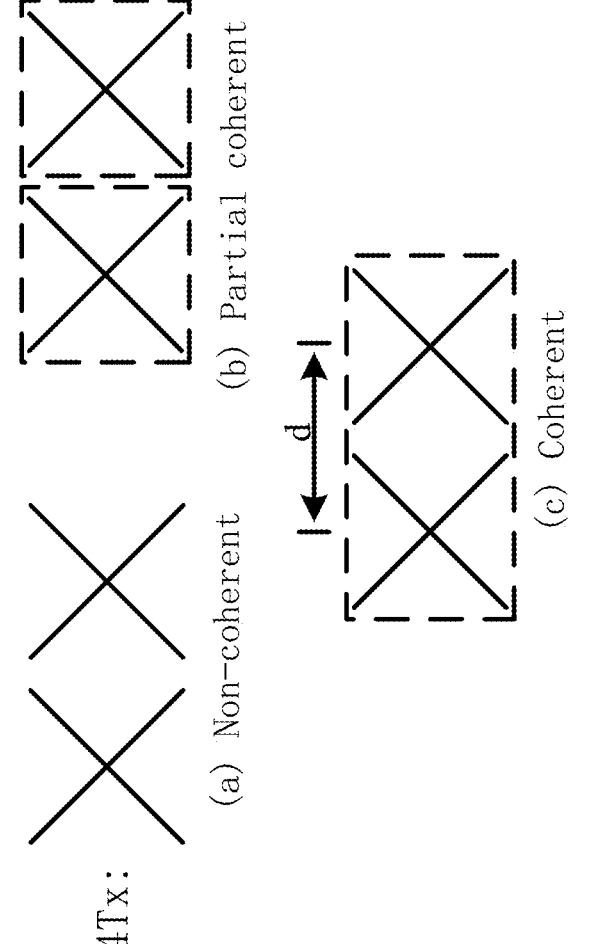
FIG. 1B shows a representation of 4 Tx for coherent, partial coherent, and non-coherent transmissions.

FIG. 1B shows a representation of 4 Tx for coherent, partial coherent, and non-coherent transmissions. Properties of 4Tx include non-coherent, partial coherent, and full coherent types. For the full coherent type, the distance between two groups of cross polarization can be $\lambda/2$ or any other values (e.g., $K*\lambda$ in general, or other value for distributed antennas, such as heterogeneous or UE aggregation), where $\lambda$ is the wavelength. Tx beams may have a common polarization. A single phase value may apply to precoder(s) of all antennas with same polarization (e.g., per layer).

FIG. 1C shows a representation of 6 Tx for full coherent, partial coherent, and non-coherent transmissions. Properties of 6Tx include combinations of {2, 2, 2}, {4, 2} can be considered for a partial coherent case.

Figure 1D:
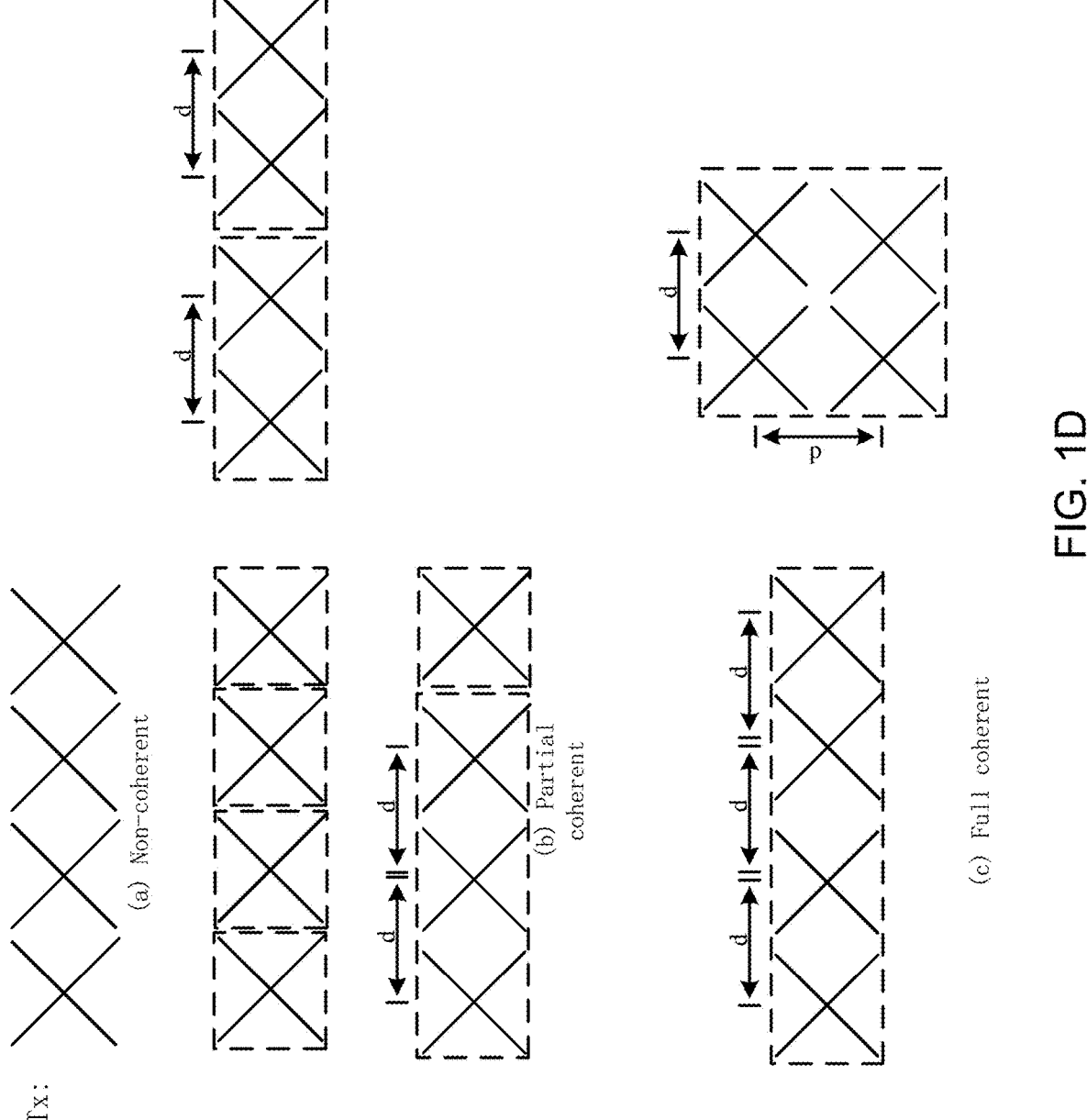
FIG. 1D shows a representation of 8 Tx for full coherent, partial coherent, and non-coherent transmissions.

FIG. 1D shows a representation of 8 Tx for full coherent, partial coherent, and non-coherent transmissions. Properties of 8Tx include combinations of {2, 2, 2, 2}, {4, 4}, {6, 2} can be considered for partial coherent case.

Figure 2:
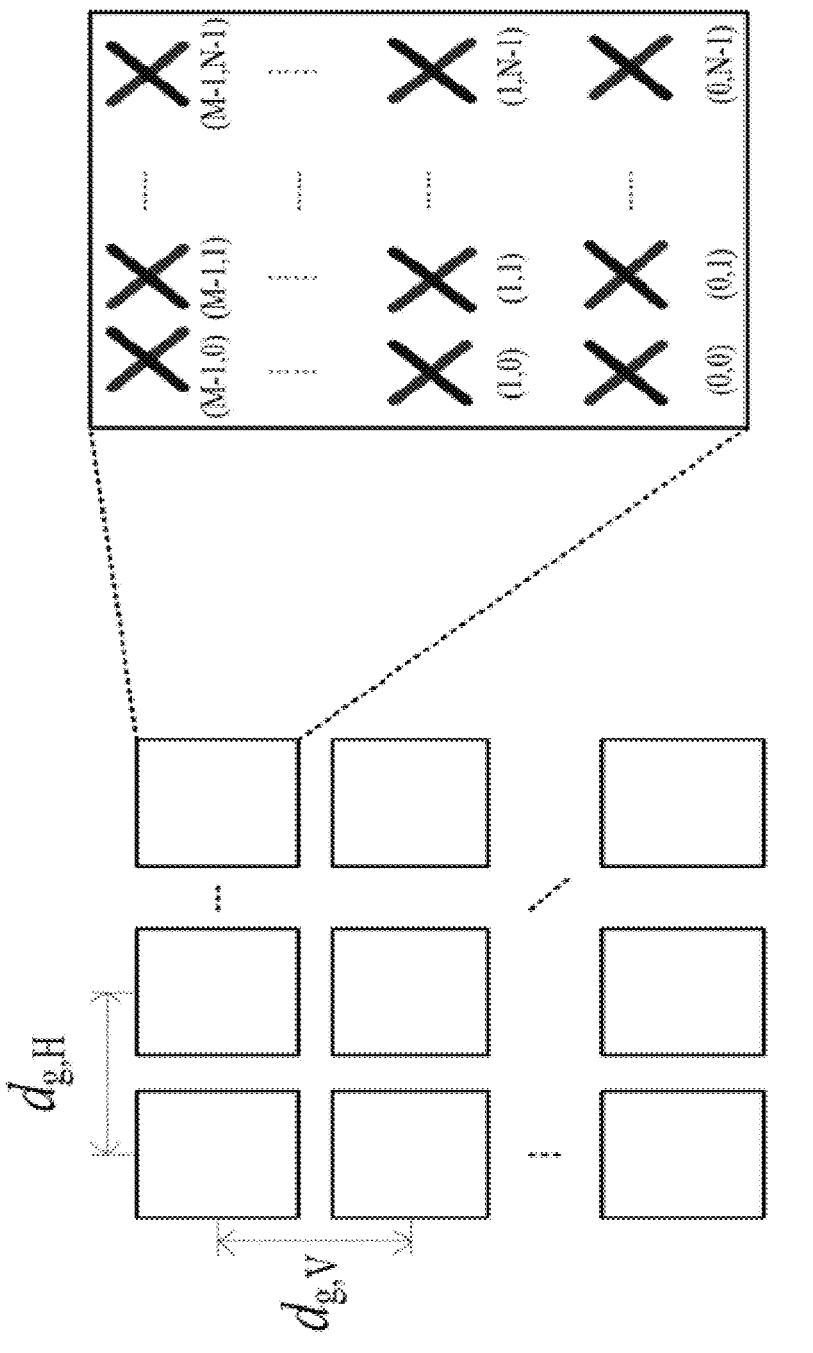
FIG. 2 shows an example of a dual-polarized antenna panel group model.

FIG. 2 shows an example of a dual-polarized antenna panel group model. The antenna configuration of a base station or terminal can be modeled as a uniform planar antenna array, including Mg×Ng panels, that is, panels with Mg columns and Ng rows, where the antenna panels are $d_{g,H}$, and $d_{g,V}$ in the horizontal and vertical dimensions, respectively, the spacing is uniformly distributed. Each panel can include antenna elements including M rows and N columns, the antenna elements with antenna elements uniformly distributed with the spacing of $d_H$ and $d_V$ in the horizontal and vertical directions, and the antennas are on the XY plane and can be dual-polarized (P=2) or uni-polar (P=1). This antenna configuration can be expressed as (M, N, P, Mg, Ng). In the following, M, N can be reflected by N1, N2 respectively.

In one aspect, a motivation for some embodiments is to reduce overhead bits using discrete Fourier transforms (DFTs).

In legacy technology, TPMI reflects a precoding matrix for a coherent type

A wireless device determines its PUSCH transmission precoder based on sounding reference signal (SRS) resource indicator (SRI), TPMI and the transmission rank, where the SRI, TPMI and transmission rank are given by downlink control information (DCI) fields of SRS resource indicator and precoding information and number of layers, or given by RRC signaling of srs-ResourceIndicator and precodingAndNumberOfLayers.

Embodiment 1: Factors for Determining a Precoding Matrix

A precoder (or precoding matrix, precoding information) is determined according to at least one of following factors:
a) Number of ports, (N1*N2*P),
   N1, N2 are numbers of rows and columns of antenna elements in a panel (antenna panel) respectively, or the number of elements in the horizontal and vertical directions respectively.
   P is 2 for polarized ports, in this case there are 2 groups of ports which can be horizontal polarized group, and vertical polarized group, or can be +45 and −45 degree crossing polarized groups
   Number of ports is determined as N1*N2*P
b) Number of layers (or value of rank, can be simplified as rank),
c) At least one Vector, each for a layer, e.g., DFT vector
d) Phase offset (phi, or φ), between polarized ports
d) Offset of layer (for determining which vector is used by a layer), or
e) Coherent level (indicating coherent relation between transmit ports which includes at least one of: full coherent, partial coherent, or non-coherent. Full coherent ports can be compatible with partial coherent, non-coherent features, e.g., precoding matrix. Partial coherent ports can be compatible with non-coherent. Full coherent may be noted as full-and-partial-and-non-coherent. Partial coherent may be noted as partial-and-non-coherent. For example, assuming number of ports is X1, number of layers is X2, a precoding matrix has number of rows X1, and number of columns X2, which means each row corresponds to a port, and each column corresponds to a layer.
A vector has X1 elements for each layer, where X1=N1*N2*P,. If P=2, a phase offset exists between polarized ports. If more than one port is coherent, they can be used for transmitting for a same layer, since the phase offset between the more than one port can be well controlled. Or the more than one port are not coherent, they cannot be used for transmitting for a same layer, since phase offset between the more than one port cannot be ensured. There are 2 schemes to determine a precoding matrix considering the above factors.
   Scheme 1: Via separate factor indication. Each one or more of the above factors can be indicated by a field or an indication. All or part of the indicated factors are used to determine a precoding matrix.
   Scheme 2: via a precoding matrix index. A list of precoding matrices can be provided or predefined, each precoding matrix reflects a combination of all or part of the above factors. And a precoding matrix index, e.g., PMI, or TPMI, is provided to determine a precoding matrix.

Embodiment 2: Relation Between Factors to Determine Precoding Matrix for UL 8TX In current technology, precoding matrix for DL can support 8TX, and precoding matrix for UL can support up to 4TX. DL Tx ports in the gNB/network side can be assumed to use full coherent level. But UL Tx ports need to support full coherent, partial coherent, and non-coherent, based on wireless device capability, due to lower cost of wireless devices compared to the gNB. Coherent ports tend to require more advanced hardware which comes at a higher cost.

To support 8TX for an UL precoding matrix, the DL 8TX precoding matrix can be used directly for full coherent level, but no DL precoding matrix can be used directly for a partial or non-coherent UL precoding matrix.

Example

Factors for an example solution include:
a) Indication of rank indicates one or more ranks (or rank values). Each rank corresponds to a port group.
b) Vector e.g., v, (can also be a matrix, or a basic matrix as below) is indicated for at least one port group. In other words, at least one port group share a same vector.
   i) E.g., assuming 1 port group for 8 TX for UL, a 8-D (dimension) vector which has 8 elements or a basic matrix which has one or more 8-D vectors can be used for 8 TX ports for UL;
   ii) E.g., assuming 2 port groups for 8 TX for UL, a 4-D (dimension) vector which has 4 elements or a basic matrix which has one or more 4-D vectors can be used for 4 TX ports for UL for each port groups.
   iii) E.g., assuming 4 port groups for 8 TX for UL, a 2-D (dimension) vector which has 2 elements or a basic matrix which has one or more 2-D vectors can be used for 2 TX ports for UL for each port groups.
   iv) E.g., assuming 8 port groups for 8 TX for UL, a 1-D vector which has 1 element can be used for 2 TX ports for UL for each port groups. 1-D vector may not need to be indicated. It can be a predefined constant value, such as 1, −1, j, or −j, etc.
c) Size of the vector v can be determined according to indication of rank. Further, the number of port groups, e.g., Ng, is determined by the number of ranks, e.g., equivalent. The size of the vector v can be determined by the number of port groups, e.g., Ntx/Ng, where Ntx is the number of TX (i.e. the number of rows or ports in the precoding matrix), e.g., 8 for 8TX.
   i) E.g., if indication of rank indicates one rank (value), it may be an integer value of 1-8. The number of port groups Ng is 1, and the size of the vector v can be determined by the number of port groups, e.g., Ntx/Ng, which is 8/1=8. That means vector v is a 8-D vector which has 8 elements.

ii) E.g., if indication of rank indicates 2 ranks (value), it may be an integer value of 0-4 (all ranks which are 0s should not be allowed). The number of port groups Ng is 2, and the size of the vector v can be determined by the number of port groups, e.g., Ntx/Ng, which is 8/2=4. That means vector v is a 4-D vector which has 4 elements.

iii) Analogously, for 4 ranks (each can be an integer of 0-2, all ranks which are 0s should not be allowed), there are 4 port groups, and v is a 2-D vector; for 8 ranks, there are 8 port groups (each can be an integer of 0-1, all ranks which are 0s should not be allowed), and v is a 1-D vector.

d) At least one of phase offset, offset of layer, or coherent level is indicated for at least one port group. In other words, at least one port group share a same phase offset, offset of layer, or coherent level.

i) Alternatively, at least one of phase offset, offset of layer, or coherent level is indicated for each of the at least one port group. In this case, phase offset, offset of layer, or coherent level can be separately indicated for each port group.

A precoding matrix with partial size (compared with full size, e.g., 8 TX port for at most 8 layers) can be determined per each port group. The precoding matrix for each port group (can also be noted as a sub-matrix) constitute a full-size precoding matrix.

b) Port mapping between port index in partial size matrix and full-size matrix is predefined, or configured/indicated by gNB/NW.

c) Layer mapping between layer index in partial size matrix and full-size matrix is predefined, or configured/indicated by gNB/NW.

d) Port mapping depends on panel structure of UE, such as number of ports per panel, coherent level per panel, etc.

Vector v (can also be a matrix, or a basic matrix w as below) can be determined by one of the following schemes:

Scheme 1: v or w is determined/calculated according to parameters of at least one of $i_{1,1}$ (related to N1 and/or O1), $i_{1,2}$ (related to N2 and/or O2), $i_2$ (phase offset), or i1,3 (offset of layer), where O1 and O2 are oversampling factors in horizontal and vertical directions related to N1 and N2 respectively.

(1) $i_{1,1}$ is indicated if N1*O1 is larger than 1; otherwise $i_{1,1}$ is not needed, e.g., may be O.

(2) $i_{1,2}$ is indicated if N2*O2 is larger than 1; otherwise $i_{1,2}$ is not needed, e.g., may be O.

(3) $i_2$ is indicated if P is larger than 1, or is equal to 2; otherwise $i_2$ is not needed. If P=2, the vector of Nt-D can be determined by 2 Nt/2-D vectors, and the second Nt/2-D vector is determined by multiplying the first Nt/2-D vectors by a phase offset which is indicated by $i_2$.

(4) $i_{1,3}$ is used to determine vector for layer except the first layer. There are a list of predefined vectors, $i_{1,1}$ and $i_{1,2}$ is used to determine the vector for the first layer, $i_{1,3}$ indicates an offset for a given layer to determine the index as the offset plus the index of the vector for the first layer. or $i_{1,3}$ indicates an index of the vector for the given layer.

(5) With scheme 1, a pattern may be needed for indicating full, partial, or non-coherent level.

i) E.g., for a 8-D or a 4-D vector, a pattern is used to determine which element is zero, or non zero, for partial coherent or non-coherent ports.

Scheme 2: v or w is determined according to parameter of TPMI and/or rank/number of layers indication.

(1) TPMI and rank/number of layers indication can be used to determine a matrix. The number of columns of the matrix is equal to the number of layers. And each column of the matrix is a vector v for a layer. So the determined matrix comprises R (R is the number of layers) vectors.

(a) E.g., TPMI and/or rank/number of layers indication can be 4-port for 1 port group with rank 1-8 full coherent, partial coherent, or non-coherent 8TX.

(b) E.g., TPMI and/or rank/number of layers indication can be 4-port for 2 port groups with rank 1-4 full coherent, partial coherent, or non-coherent 4TX.

(2) The determined matrix according to TPMI and/or rank/number of layers indication can also reflect coherent level.

a) For a vector of a given layer, if no element is 0, the vector is for full coherent. If partial of elements, e.g., a half or a quarter, but not only one element, are 0s, the vector is for partial coherent. If only one element is non zero, the vector is for non-coherent.

b) A 4-TX /2TX TPMI and/or rank/number of layers indication can reflect coherent level within 4TX/ 2TX. For 8TX, whether some ports are zeros, e.g., elements for a group of 4 ports are all zeros, depends on rank indication for each port group. If a rank for a group is 0, elements for a group of 4 ports are all zeros.

(3) For a 8TX precoding matrix based on 4-port vector via determined matrix, a second phase offset may be needed.

a) E.g., for full coherent 8 TX precoding matrix with P=2, a 4-D vector and a phase offset can be used to determine 2 8-D vectors.

b) the first vector of 8-D can be determined by two 4-D vectors, and the second 4-D vector is determined by multiplying the first 4-D vectors by the second phase offset. E.g. assuming v is a 4*1 matrix, 2 8-D vectors can be determined as:

$$\begin{bmatrix} v & v \\ \phi_n v & -\phi_n v \end{bmatrix},$$

where $\phi_n = e^{j\pi n/2}$, and n is an integer.

c) v can also be replaced by a matrix, which has L columns (for L layers), each columum is a 4-D vector, L is larger than 1 and less than or equal to 4. Then at most 2L 8-D vectors can be determined as above.

Embodiment 3: Factors can be Indicated as Independent/Joint Info, or an Index of a List of Predefined Precoding Matrices The above factors can be indicated from gNB/NW to UE independently or jointly, or partial jointly.

To further reduce overhead, a list of (full sized) precoding matrices can be indexed. Precoding matrix can be indicated by an index, such as a PMI or TPMI.

The list of precoding matrices are predefined and each of which reflects a configuration of all above factors.

The list of precoding matrices can be determined according to UE capability, such as coherent level. E.g., if a UE only supports non-coherent level, the list of precoding matrices comprise non-coherent precoding matrices. If a UE supports partial coherent level, the list of precoding matrices comprise non-coherent precoding matrices and partial coherent precoding matrices. If a UE supports full coherent level, the list of precoding matrices comprise non-coherent precoding matrices, partial coherent precoding matrices, and full coherent precoding matrices. For 8 TX UL transmission, non-coherent may not be supported.

For 8 TX, partial coherent may comprise at least one of:
1) First partial coherent, for which 4 ports are coherent. It may also be referred as partial 4-port coherent.
2) Second partial coherent, for which 2 ports are coherent. It may also be referred as partial 2-port coherent.

Embodiment 4: Rank /Rank Combination Design for 8-Tx Codebook

Assuming a UE with M-Tx, (M is an integer larger than 1), each Tx in M-Tx can also be known as port, or antenna port.

If none of ports are coherent, M-Tx can be known as non-coherent M-Tx.

If partial of ports are coherent, M-Tx can be known as partial coherent M-Tx. A UE supporting partial coherent ports may support working as non-coherent ports.

If all ports are coherent, M-Tx can be known as coherent M-Tx, or full coherent M-Tx. A UE supporting full coherent ports may support working as partial coherent or non-coherent ports.

Uplink transmission precoder should support full coherent, partial coherent and non-coherent. That means codebook should support full coherent, partial coherent and non-coherent for uplink transmission.

A legacy technology supports up to 4 Tx for uplink transmission, and it supports codebook/precoder for 4Tx for full coherent, partial coherent and non-coherent by using different TPMIs, i.e., using a list of matrices for precoders each of which corresponding to a unique TPMI.

If codebook for M-Tx for full coherent, partial coherent and non-coherent also be supported as a list of matrices, the length of the list would be very large when M is greater than 4, e.g., 8. It is better to adopt a structured framework for 8-Tx codebook design, which is a uniform scheme for full coherent, partial coherent and non-coherent cases.

In this document, full coherent, partial coherent and non-coherent M-Tx may correspond to one panel or multiple panels which can share same spatial basic vector, or a basic matrix. In short, multiple panels share a same spatial or beam direction (represented as spatial basic vector, or a basic matrix). For the case that multiple panels have independent spatial or beam directions, each panel should correspond to an individual precoder (i.e. basic vector, or basic matrix), instead of a single precoder discussed in this document.

A precoder for an uplink transmission can be determined according to at least one of:
1) Rank indication, indicating one or more rank values (can also be number of layers)
2) Spatial vector reusing DL DFT vector or reusing TPMI, which is determined according to rank indication. E.g., dimension/size of spatial vector, such as 1-D, 2-D, 4-D, 8-D, etc. for DL DFT vector; number of ports for TPMI for 2TX, 4TX, etc. can be determined according to the rank indication.

The one or more than one rank value correspond to multiple panels, or multiple port groups. Each rank value corresponds to one panel, one panel group or one port group.

Assuming there are at most 2 port groups, then rank indication comprises a list of single rank values for 1 port group and/or a list of rank value pairs for 2 port groups. Each rank value pair corresponds to 2 port groups.

As shown in Table 1, rank indication values of 0-23 indicates 24 rank value pairs. For each pair, first rank value corresponds to first port group and second rank value corresponds to second port group. Rank indication value of 24-31 indicates 8 single rank values for a single port group with 8Tx.

TABLE 1

| Rank indication value | First rank value | Second rank value (if present) |
|---|---|---|
| 0-3 | 1-4 | 0 |
| 4-8 | 0-4 | 1 |
| 9-13 | 0-4 | 2 |
| 14-18 | 0-4 | 3 |
| 19-23 | 0-4 | 4 |
| 24-31 | 1-8 | |

In another example Table 2 has 16 entries. There is a restriction for the rank value pair that the second rank value is same as the first rank value, or the second rank value is smaller than the first rank value but offset is only a predetermined value delta, e.g., delta =1. If delta is 2, the first rank value can be 2-4.

TABLE 2

| Rank indication value | First rank value | Second rank value (if present) |
|---|---|---|
| 0-3 | 1-4 | Same as first rank value |
| 4-7 | 1-4 | First rank value - delta, e.g., delta = 1 |
| 8-15 | 1-8 | |

Assuming there are at most 4 port groups, then rank indication comprises a list of single rank values for 1 port group and/or a list of rank value pairs for 2 port groups, and/or a list of rank value combinations for 4 port groups. Each rank combination for 4 port groups has 4 rank values and corresponds to 4 port groups.

For each rank value combination for 4 port groups, each rank value can be an integer of 0-4, and it is not allowed that all the 4 rank values are 0s. To reduce overhead, there may be some restriction for the 4 rank values in each rank value combination.

Restriction may comprise at least one of:
all rank values are equal,
the rank values in a group can be equal, e.g. each 2 rank values are in a group, the first rank value and the second (or the third) rank value are in a group, should have same value, and other rank values are in another group, and they have a same value.
the 4 rank values are in an ascending or a descending order, e.g. the first rank value>=the second rank value>=the third rank value>=the fourth rank value.
the offset of the 4 rank values is less than a predefined value, e.g. 2.

Assuming there are at most 8 port groups, then rank indication comprises a list of single rank values for 1 port group and/or a list of rank value pairs for 2 port groups, and/or a list of rank value combinations for 4 port groups, and/or a list of rank value combinations for 8 port groups. Each each rank combination for 8 port groups has 8 rank values and corresponds to 8 port groups. For each rank value combination for 8 port groups, each rank value can be an integer of 0-8, and it is not allowed that all the 8 rank values are Os. To reduce overhead, there may be some restriction for the 8 rank values in each rank value combination. Restriction may comprise at least one of:

all rank values are equal, the rank values in a group can be equal, e.g. each 2 or 4 rank values are in a group. E.g., the first rank value and the second (or the third) rank value are in a group, should have same value, and other rank values are in another group, and they have a same value.

the 8 rank values are in an ascending or a descending order, e.g. the first rank valu>=the second rank value>= . . . >=the eighth rank value.

the offset of the 8 rank values is less than a predefined value, e.g. 2.

Spatial vector reusing DL DFT vector or reusing TPMI, which is determined according to rank indication.

If rank indication indicates a single rank value, spatial vector can be a 8-D vector. The spatial vector can be indicated by at least one of $i_{1,1}$, $i_{1,2}$, or $i_{1,3}$, for 8TX, or by a 4-port TPMI.

If rank indication indicates a pair of rank values, spatial vector can be a 4-D vector. The spatial vector can be indicated by at least one of $i_{1,1}$ $i_{1,2}$, $i_2$, or $i_{1,3}$, for 4TX, or by a 4-port TPMI.

Presence of $i_{1,1}$, or $i_{1,2}$, depends on value of N1, N2 respectively. If N1 equals $i_{1,1}$, may not be present; if N2 equals 1, $i_{1,2}$, may not be present.

Presence of $i_{1,3}$ depends on value of single rank value or a maximum value for multiple rank values. If the value of the rank (single rank value or a maximum value for multiple rank values) is larger than 2, $i_{1,3}$ may be present. Further, if the value of the rank (single rank value or a maximum value for multiple rank values) is smaller than 5, $i_{1,3}$ may be present.

If rank indication indicates four rank values, spatial vector can be a 2-D vector. The spatial vector can be indicated by at least one of $i_{1,1}$, $i_{1,2}$, $i_2$, or $i_{1,3}$, for 2TX, or by a 2-port TPMI.

If rank indication indicates 8 rank values, spatial vector can be a 1-D vector. The spatial vector can be a predefined value.

Embodiment 5: Vector/Matrix Design for 8 TX

A precoding matrix for UL 8TX can be determined as one of a set/list of precoding matrices.

The set of precoding matrices comprise at least one subset, and each subset corresponds to a respective number of groups. The number of groups can be 1, 2, 3, 4, or 8.

The set of precoding matrices comprise at least one of:
A first subset of precoding matrices for 1 port group,
A second subset of precoding matrices for 2 port groups,
A third subset of precoding matrices for 4 port groups, or
A fourth subset of precoding matrices for 8 port groups.

1). For a first subset of precoding matrices for 1 port group, one rank value (or number of layers) is indicated or determined. The rank value R can be an integer from 1 to 8.

A precoding matrix in the first subset can be determined according to at least one of the above factors.

Vector v can be determined via scheme1, as discussed above: V is determined/calculated according to parameters of at least one of $i_{1,1}$ (related to N1 and/or O1), $i_{1,2}$ ((related to N2 and/or O2)), $i_2$ (phase offset), or $i_{1,3}$ (offset of layer).

For example, assuming N1*N2*P=8 for 8TX 8-port pre-coding matrix design, e.g., N1=4, O1=4, N2=1, N2=1, P=2, precoding matrix W is determined according to $i_{1,1}$, $i_{1,2}$, $i_2$, or $i_{1,3}$ which is same as for DL 8TX. Here 1 layer, 2 layers and 5 layers are shown as following for instance.

For R=1, i.e., 1 layer, precoding matrix W is determined according to:

| $i_{1,1}$ | $i_{1,2}$ | $i_2$ | |
|---|---|---|---|
| $0, 1, \ldots, N_1O_1 - 1$ | $0, \ldots, N_2O_2 - 1$ | $0, 1, 2, 3$ | $W_{i_{1,1}, i_{1,2}, i_2}^{(1)}$ |

$$\text{where } W_{l,m,n}^{(1)} = \frac{1}{\sqrt{P_{CSI-RS}}} \begin{bmatrix} v_{l,m} \\ \varphi_n v_{l,m} \end{bmatrix}.$$

For R=2, i.e., 2 layers, precoding matrix W is determined according to:

| $i_{1,1}$ | $i_{1,2}$ | $i_2$ | |
|---|---|---|---|
| $0, 1, \ldots, N_1O_1 - 1$ | $0, \ldots, N_2O_2 - 1$ | $0, 1$ | $W_{i_{1,1}, i_{1,1}+k_1, i_{1,2}, i_{1,2}+k_2, i_2}^{(2)}$ |

$$\text{where } W_{l,l',m,m',n}^{(2)} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}.$$

and the mapping from $i_{1,3}$ to $k_1$ and $k_2$ is given in Table 3.

The mapping from $i_{1,3}$ to $k_1$ and $k_2$ for 2-layer reporting is given in Table 3.

TABLE 3

Mapping of $i_{1,3}$ to $k_1$ and $k_2$ for 2-layer CSI reporting

| $i_{1,3}$ | $N_1 > N_2 > 1$ | | $N_1 = N_2$ | | $N_1 = 2, N_2 = 1$ | | $N_1 > 2, N_2 = 1$ | |
|---|---|---|---|---|---|---|---|---|
| | $k_1$ | $k_2$ | $k_1$ | $k_2$ | $k_1$ | $k_2$ | $k_1$ | $k_2$ |
| 0 | 0 | 0 | 0 | 0 | 0 | 0 | 0 | 0 |
| 1 | $O_1$ | 0 | $O_1$ | 0 | $O_1$ | 0 | $O_1$ | 0 |
| 2 | 0 | $O_2$ | 0 | $O_2$ | | | $2O_1$ | 0 |
| 3 | $2O_1$ | 0 | $O_1$ | $O_2$ | | | $3O_1$ | 0 |

For R=5, i.e., 5 layers, precoding matrix W is determined according to:

| $i_{1,1}$ | $i_{1,2}$ | $i_2$ | |
|---|---|---|---|
| $N_2 > 1$ | $0, \ldots, N_1O_1 - 1$ | $0, \ldots, N_2O_2 - 1$ | $0, 1$ | $W_{i_{1,1}, i_{1,1}+O_1, i_{1,1}+O_1, i_{1,2}, i_{1,2}, i_{1,2}+O_2, i_2}^{(5)}$ |
| $N_1 > 2, N_2 = 1$ | $0, \ldots, N_1O_1 - 1$ | 0 | $0, 1$ | $W_{i_{1,1}, i_{1,1}+O_1, i_{1,1}+2O_1, 0, 0, 0, i_2}^{(5)}$ |

| $i_{1,1}$ | $i_{1,2}$ | $i_2$ |
|---|---|---|

$$\text{where } W^{(5)}_{l,l',l'',m,m',m'',n} = \frac{1}{\sqrt{5P_{CSI-RS}}} \begin{bmatrix} v_{l,m} & v_{l,m} & v_{l',m'} & v_{l',m'} & v_{l'',m''} \\ \varphi_n v_{l,m} & -\varphi_n v_{l,m} & v_{l',m'} & -v_{l',m'} & v_{l'',m''} \end{bmatrix}.$$

where $\varphi_n$, $\theta_p$, $u_m$, $v_{l,m}$, and $\tilde{v}_{l,m}$ are given by $$\varphi_n = e^{j\pi n/2}$$

$$\theta_p = e^{j\pi p/4}$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$\tilde{v}_{l,m} = \begin{bmatrix} u_m & e^{j\frac{4\pi l}{O_1 N_1}} u_m & \cdots & e^{j\frac{4\pi l(N_1/2-1)}{O_1 N_1}} u_m \end{bmatrix}^T$$

Alternatively, vector v can be determined scheme2, as discussed above: v is determined according to parameter of TPMI and/or rank/number of layers indication.

Vector is determined by multiplying the first 4-D vectors by the second phase offset (phi, or φ). Assuming v is a 4*1 matrix, 2 8-D vectors can be determined as:

$$\begin{bmatrix} v & v \\ \phi_n v & -\phi_n v \end{bmatrix},$$

where $\varphi_n = e^{j\pi n/2}$, and n is an integer.

For R=1, v is a 4*1 matrix, 8*2 matrix can be determined as above, the first column is determined as R=1, 8*1 precoding matrix.

For R=2, v is a size of 4*1 matrix, 8*2 matrix can be determined as above, the two columns are determined as R=2, 8*2 precoding matrix.

For R=3, v is a 4*2 matrix, 8*4 matrix can be determined as above, the first 3 columns are determined as R=3, 8*3 precoding matrix.

For R=4, v is a 4*2 matrix, 8*4 matrix can be determined as above, the four columns are determined as R=4, 8*4 precoding matrix.

For R=5, or 6, v is a 4*3 matrix, 8*6 matrix can be determined as above, the first 5 columns are determined as 8*5 precoding matrix, and the 6 columns are determined as 8*6 precoding matrix.

For R=7, or 8, v is a 4*4 matrix, 8*8 matrix can be determined as above, the first 7 columns are determined as 8*7 precoding matrix, and the 8 columns are determined as 8*8 precoding matrix.

The above 4*1, 4*2, 4*3, or 4*4 matrix can be determined by TPMI for 4 ports for rank=1, 2, 3 or 4 respectively. These matrices are full coherent.

2). For a second subset of precoding matrices for 2 port groups, two rank values (or number of layers) are indicated or determined. Each rank value (e.g. R1, R2) can be an integer from 0 to 4. Two rank values cannot be both 0s Two small size precoding matrices (i.e. sub-matrices) can be determined per each port group with size of 4*R1, and 4*R2.

2 groups can share a basic vector, or a basic matrix.

Basic vector (or a basic matrix, a basic precoding matrix) can be indicated as a basic precoding matrix with size of 4*max (R1, R2).

A basic precoding matrix can be determined by either scheme1 (DL-like) or scheme 2 (TPMI based).

Assume R1>=R2 for discussion (R2 can be larger than R1 in reality), a basic precoding matrix is indicated as size of 4*R1. The basic precoding matrix is used as precoding matrix for port group 1, and the first R2 columns of the basic precoding matrix is used as precoding matrix for port group 2.

E.g., R1=1, R2=0, a basic precoding matrix can be determined as a matrix as size of 4*1 for group 1, no precoding matrix or a null matrix for group 2, or all zeros matrix are for group 2.

The 8-D precoding matrix can be
matrix for group 1:

$$\begin{bmatrix} v_0 \\ v_1 \\ v_2 \\ v_3 \end{bmatrix}$$

matrix for group2:

$$\begin{bmatrix} 0 \\ 0 \\ 0 \\ 0 \end{bmatrix}$$

matrix for 8TX:

$$\begin{bmatrix} v_0 \\ 0 \\ v_1 \\ 0 \\ v_2 \\ 0 \\ v_3 \\ 0 \end{bmatrix} \text{ or } \begin{bmatrix} v_0 \\ v_1 \\ 0 \\ 0 \\ v_2 \\ v_3 \\ 0 \\ 0 \end{bmatrix}$$

Port mapping between 4-D and 8-D can be predefined or configured by gNB.

Port mapping between 4-D and 8-D can be determined by the following table. The mapping pattern can be predefined or configured by gNB or NW.

| Port index in 4-D | | Port index in 8-D Mapping patern 1 | Port index in 8-D Mapping patern 2 | Port index in 8-D Mapping patern 3 |
|---|---|---|---|---|
| port group 0 | 0 | 0 | 0 | 0 |
| | 1 | 1 | 2 | 1 |
| | 2 | 2 | 4 | 4 |
| | 3 | 3 | 6 | 5 |

-continued

| Port index in 4-D | | Port index in 8-D Mapping patern 1 | Port index in 8-D Mapping patern 2 | Port index in 8-D Mapping patern 3 |
|---|---|---|---|---|
| Port | 0 | 4 | 1 | 2 |
| group | 1 | 5 | 3 | 3 |
| 1 | 2 | 6 | 5 | 6 |
| | 3 | 7 | 7 | 7 |

Similarly layer mapping between 4-D and 8-D can be predefined or configured by gNB. Layer mapping between 4-D and 8-D can be determined by one of the following schemes:

1. In full size matrix, all layers of first port group are in front of all layers of the second port group, and then all layers of the subsequent port groups.

E.g., assuming 2 port groups, port group 0 has 3 layers, port group 1 has 2 layers, then in full size matrix, first 3 layers are all layers of port group 0, the next 2 layers are 2 layers of port group 1.

2. In full size matrix, layers from different port groups are interleaved.

E.g., assuming 2 port groups, port group 0 has 3 layers, port group 1 has 2 layers, then in full size matrix, first layer is the first layer of port group 0, second layer is the first layer of port group 1, the third layer is the second layer of port group 0, the fourth layer is the second layer of port group 1, the fifth layer is the third layer of port group 0. that means in the order of port group index first, then in the order of layer index in one port group.

The basic precoding matrix can be determined by TPMI for 4 ports for rank=1, 2, 3 or 4 respectively. These matrices are full coherent.

3). For a third subset of precoding matrices for 4 port groups, two rank values (or number of layers) are indicated or determined. Each rank value (R1, R2, R3, R4) can be an integer from 0 to 2. All rank values cannot be 0s.

Four small size precoding matrices can be determined per each port group with size of 2*R1, 2*R2, 2*R3 and 2*R4.

4 groups can share a basic vector.

Basic vector (basic precoding matrix) can be indicated as a basic precoding matrix with size of 2*max (R1, R2, R3, R4).

A basic precoding matrix can be determined by either scheme1 (DL-like) or scheme 2 (TPMI based).

Assume R1=max (R1, R2, R3, R4) for discussion, a basic precoding matrix is indicated as size of 2*R1. The basic precoding matrix is used as precoding matrix for port group 1, and the first R2, R3, R4 columns of the basic precoding matrix is used as precoding matrix for port group 2, 3, 4 respectively.

The basic precoding matrix can be determined by TPMI for 2 ports for rank=1, 2, respectively. These matrices are full coherent.

Port mapping between 2-D and 8-D can be determined by the following table. The mapping pattern can be predefined or configured by gNB or NW.

| Port index in 2-D | | Port index in 8-D Mapping patern 1 | Port index in 8-D Mapping patern 2 | Port index in 8-D Mapping patern 3 |
|---|---|---|---|---|
| port | 0 | 0 | 0 | 0 |
| group 0 | 1 | 1 | 2 | 1 |
| Port | 0 | 2 | 4 | 4 |
| group 1 | 1 | 3 | 6 | 5 |

-continued

| Port index in 2-D | | Port index in 8-D Mapping patern 1 | Port index in 8-D Mapping patern 2 | Port index in 8-D Mapping patern 3 |
|---|---|---|---|---|
| port | 0 | 4 | 1 | 2 |
| group 2 | 1 | 5 | 3 | 3 |
| Port | 0 | 6 | 5 | 6 |
| group 3 | 1 | 7 | 7 | 7 |

Layer mapping between 2-D and 8-D can be determined by one of the following schemes:

1. In full size matrix, all layers of first port group are in front of all layers of the second port group, and then all layers of the subsequent port groups. Similar to 4-D and 8-D example.

2. In full size matrix, layers from different port groups are interleaved. Similar to 4-D and 8-D example.

4) For a fourth subset of precoding matrices for 8 port groups, 4 rank values (or number of layers) are indicated or determined. Each rank value (R1, R2, . . . , R8) can be an integer from 0 to 1. All rank values cannot be 0s.

Four small size precoding matrices can be one predefined value, e.g., 1 for rank=1, 0 for rank=0.

Embodiment 6: pattern design for 8 TX partial/non-coherent with rank combination A pattern is used to determine which element in a vector or a matrix is zero, or non zero. The pattern is indicated if number of rank value is greater than 1, e.g., for partial coherent or non-coherent ports cases.

In case there are 2 port groups, each port group comprises 4 ports.

A pattern indicates at least one of:

1) All ports are NZP (non zero power);

2) Half ports are NZP which comprises at least one of first half, second half, even indexed, or odd indexed; or 3) A quarter of ports are NZP which comprises at least one of first, second, third, or fourth.

Figure 3:
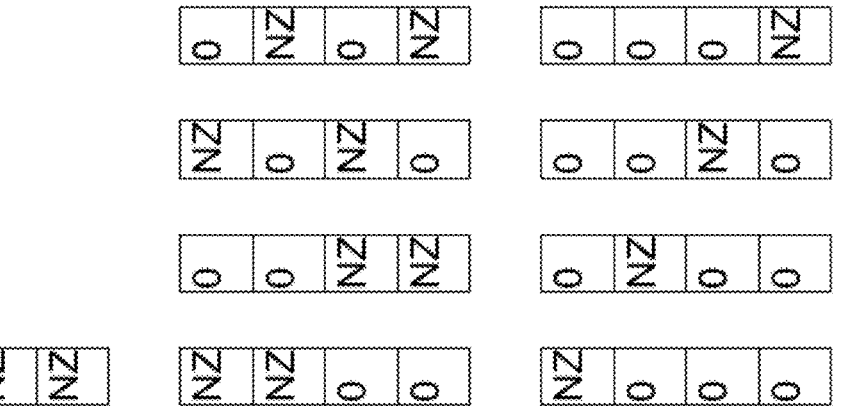
FIG. 3 shows an example pattern for 4 ports.

Example for the pattern for 4 ports is illustrated in FIG. 3.

If a port group comprises 2 ports, the pattern indicates at least one of:

1) All ports are NZP (non zero power)

2) Half ports are NZP which comprises at least one of first half, second half.

Figure 4:
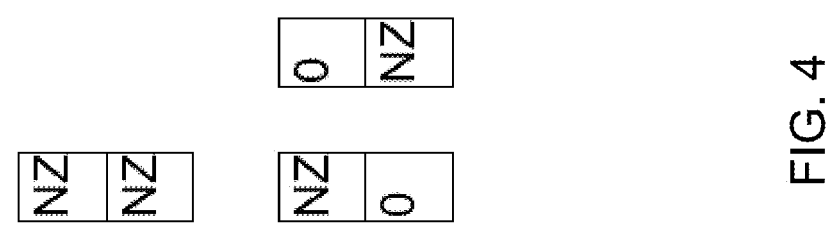

Example for the pattern for 4 ports is illustrated in FIG. 4.

The pattern can be shared by all ports groups. Alternatively, the pattern can be indicated for each port group. That means the pattern for port groups can be same or different.

For a port group, if the sub matrix corresponds to more than one layer, the pattern is directly used for the first layer, and subsequent layer can be determined as one of: a same pattern, or a hopped pattern.

A hopped pattern may be determined for half ports are NZP which comprises first half, second half, as follows, If the pattern is first half, the hopped pattern is the second half. If the pattern is second half, the hopped pattern is the first half.

E.g., pattern for the first layer is the first half, pattern for the $2^{nd}$, $3^{rd}$ layer, $4^{th}$ are second half, first half, and second half.

The even/odd-indexed halves may have the similar schemes.

A hopped pattern may be determined for A quarter of ports are NZP which comprises first, second, third, or fourth, as follows: a same pattern, or a hopped pattern.

A hopped pattern may be determined according to a predefined order circularly. A predefined order comprises one of: a) first, second, third, fourth, or b) first, third, second, fourth.

FIG. 5 shows an example with 2 port groups with 1 layer and 3 layers respectively, a pattern with even indexed half and a hopped pattern for the layers except layer 1.

Figure 6:
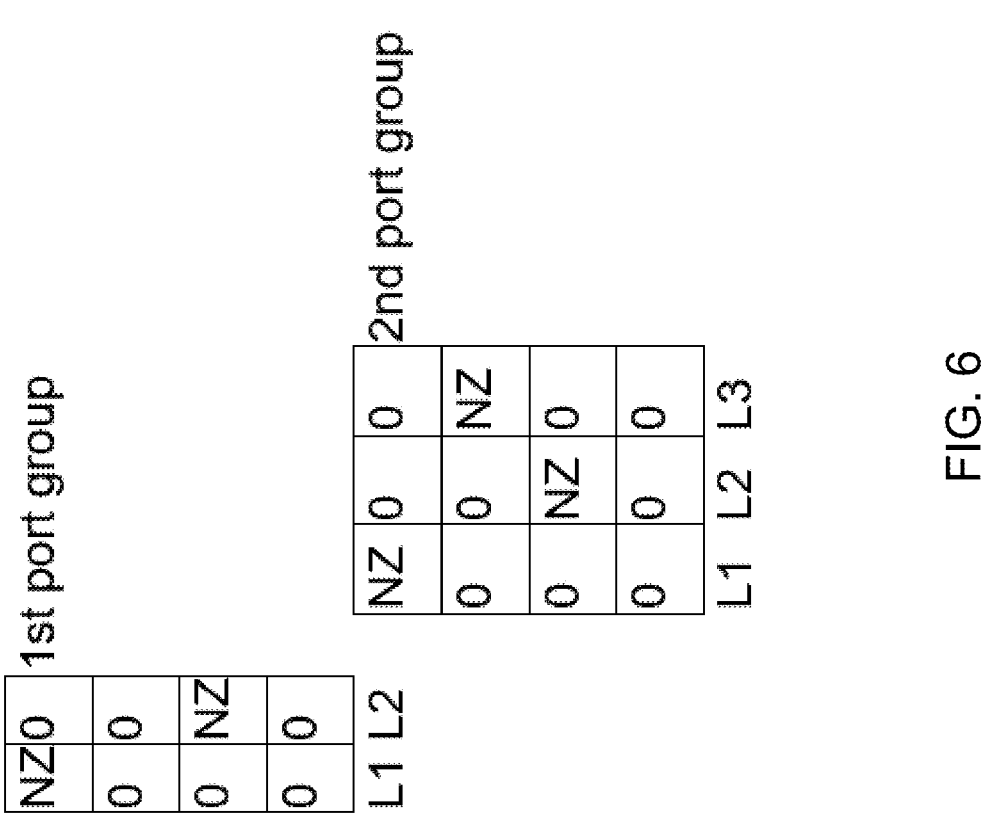
FIG. 6 shows another example with 2 port groups with 2 layers and 3 layers respectively.

FIG. 6 shows an example with 2 port groups with 2 layers and 3 layers respectively, a pattern quarter of ports are NZP which comprises at least one of first, second, third, or fourth, and a hopped pattern for the layers except layer 1, and a predefined order comprises, first, third, second, fourth.

Embodiment 7: 8-Tx Codebook Design

UE determines G rank values (each rank value corresponding to a number of layers), wherein G is an positive integer. Each rank value corresponds to a respective port group.

UE determines a sub matrix $W_{P_i \times K_i}$ for a port group i as the basic matrix if $K_i$ is equal to $k_b$, and $P_i$ is equal to $P_b$.

UE determines a sub matrix $W_{P_i \times K_i}$ for a port group i as a sub matrix of the basic matrix if $K_i$ is smaller than $K_b$, or $P_i$ is smaller than $P_b$. $W_{P_i \times K_i}$ is determined as certain K, out of $K_b$ columns and certain Pi out of $P_b$ rows of the basic matrix.

E.g., the certain $K_i$ out of $K_b$ may be the first/lowest, last/highest, or in a predefined order, $K_i$ out of $K_b$. Assuming K, =2, and $K_b$ =4, the first 2 columns of basic matrix can be used to determine $W_{P_i \times K_i}$. If Pi=Pb, the first 2 columns of basic matrix can be $W_{P_i \times K_i}$.

E.g., the certain Pi out of Pb may be the first/lowest, last/highest, or in a predefined order, Pi out of Pb. Assuming Pi=2, and Pb=4, the first 2 rows, or the first 2 odd/even indexed rows of basic matrix can be used to determine $W_{P_i \times K_i}$.

TABLE 4

| Bit field mapped to index | | G rank values, basic matrix $W_{P_b \times K_b}$. |
|---|---|---|
| UL precoding matrix indication for 8TX | | |
| $N_{8,1}$ entries | One rank value for 1 port group | Rank = 1 (1 layer), $W_{P_b \times K_b} = W_{8 \times 1}$ assuming number of candidates for $W_{8 \times 1}$ is $N_{8,1}$ |
| $N_{8,2}$ entries | | Rank = 2 (2 layers), $W_{P_b \times K_b} = W_{8 \times 2}$ assuming number of candidates for $W_{8 \times 2}$ is $N_{8,2}$ |
| . . . | | . . . |
| $N_{8,8}$ entries | | Rank = 8 (8 layers), $W_{P_b \times K_b} = W_{8 \times 8}$ assuming number of candidates for $W_{8 \times 8}$ is $N_{8,8}$ |
| number of entries: For each pair of $K_1$, $k_2$: $N_{4, Kb}$ | Two rank values for 2 port groups | 2 rank values: $K_1$, $K_2$ can be 0~4, except $K_1 = 0$, $K_2 = 0$ $W_{P_b \times K_b} = W_{4 \times K_b}$ assuming number of candidates for $W_{4 \times K_b}$ is $N_{4, Kb}$ |
| number of entries: For each combination of $K_1$~$K_4$: $N_{2, Kb}$ | Four rank values for 4 port groups | 4 rank values: $K_1$, $K_2$, . . . , $K_4$ can be 0~2, except $K_1$~$K_4$ are all 0s $W_{P_b \times K_b} = W_{2 \times K_b}$ assuming number of candidates for $W_{2 \times K_b}$ is $N_{2, Kb}$ |
| number of entries: For each combination of $K_1$~$K_8$: 1 | Eight rank values for 8 port groups | 8 rank values: $K_1$, $K_2$, . . . , $K_8$ can be 0~1, except $K_1$~$K_8$ are all 0s W = 1, or another predefined value. |

UE determines a basic matrix $W_{P_b \times K_b}$, wherein $P_b$ and $K_b$ are basic number of transmit ports, and basic value of rank (or number of layers).

UE determines a precoding matrix $W_{P \times K}$ according to at least one of the G rank values, or the basic matrix $W_{P_b \times K_b}$ for a transmission with P transmit ports and K layers.

G rank values can be noted as $K_1$, $K_2$, . . . , $K_G$, or $K_i$, i∈{1,2, . . . , G}.

Numbers of ports in G port groups can be noted as $P_1$, $P_2$, . . . , $P_G$, or $P_i$, i∈{1,2, . . . ,G}.

Sum of G rank values is equal to K, i.e., sum($K_1$, $K_2$, . . . , $K_G$)=K.

Sum of numbers of ports in G port groups is equal to P, i.e., sum($P_1$, $P_2$, . . . , $P_G$)=P.

$P_i$ can be P, P/2, P/4, or P/8.

$P_1$, $P_2$, . . . , $P_G$ can be same value. Then $P_i$=P/G.

$K_i$ can be an integer from 0 to Pi.

$K_b$ is maximum number of $K_1$, $K_2$, . . . , $K_G$.

$P_b$ is maximum number of $P_1$, $P_2$, . . . , $P_G$.

UE determines a sub matrix for each port group if the rank value for the port group is not 0. If the rank value for a port group is 0, the sub matrix is empty.

UE determines a sub matrix $W_{P \times K_i}$ for a port group i as the basic matrix, or a sub matrix of the basic matrix.

The basic matrix can be determined by a rank and corresponding TPMI or a set of parameters for DFT vector-based matrix (similar to DL, $i_{1,1}$, $i_{1,2}$, $i_{1,3}$, $i_2$, etc.).

UE determines a precoding matrix $W_{P \times K}$ (according to at least one of the G rank values, or the basic matrix $W_{P_b \times K_b}$, for a transmission with P transmit ports and K layers, further comprising at least one of:

UE determines a first mapping between port index in sub-matrix and port index in precoding matrix, or UE determines a second mapping between layer index in sub-matrix and layer index in precoding matrix.

UE determines a sub matrix for each port group, and determines a precoding matrix $W_{P \times K}$ according to at least one of the sub-matrix for each port group, the first mapping, or the second mapping.

If a UE cannot support full coherent, can only support partial coherent, the UE may support a part of entries in above table for overhead reduction.

FIG. 7 discloses a method of wireless communication 700, in accordance with some example embodiments. At 710, the method includes receiving a rank indication or a first index associated with the rank indication, wherein the rank indication is used to determine G rank values, wherein G is a positive integer. At 720, the method includes receiving a matrix indication or a second index associated with the matrix indication, wherein the matrix indication is used to determine a basic matrix. At 730, the method includes determining a precoding matrix for a transmission according to at least one of the G rank values or the basic matrix.

FIG. 8 discloses another method of wireless communication 800, in accordance with some example embodiments. At 810, the method includes transmitting a rank indication or a first index associated with the rank indication, wherein the rank indication is used to determine G rank values, wherein G is a positive integer. At 820, the method includes transmitting a matrix indication or a second index associated with the matrix indication, wherein the matrix indication is used to determine a basic matrix, wherein the transmitting the rank indication or the first index associated with the rank indication and the transmitting the matrix indication or the second index associated with the matrix indication enable a wireless device to determine a precoding matrix for a transmission of data.

Figure 9:
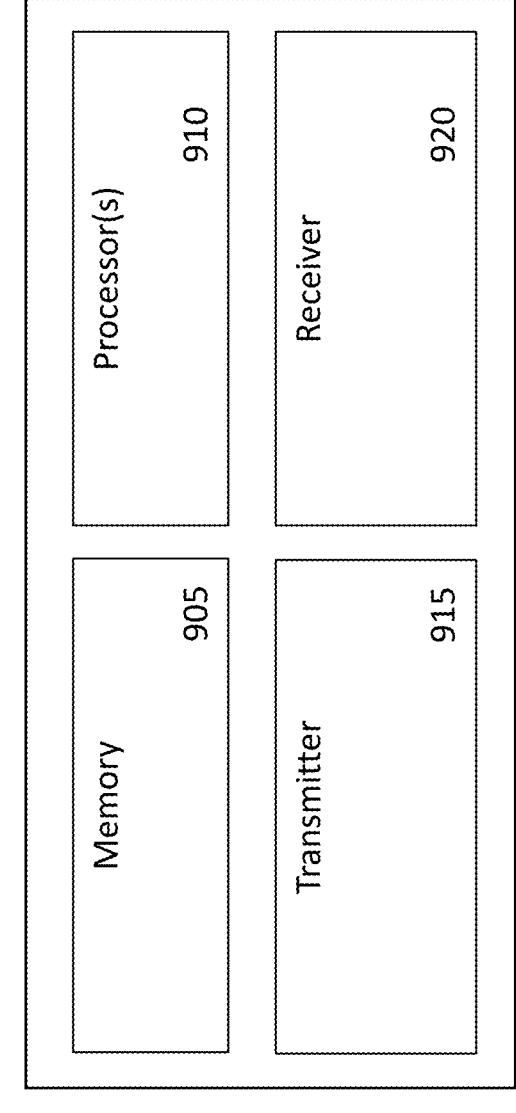
FIG. 9 shows an exemplary block diagram of a hardware platform that may be a part of a network device or a communication device.

FIG. 9 shows an exemplary block diagram of a hardware platform 900 that may be a part of a network device (e.g., base station) or a communication device (e.g., a user equipment (UE)). The hardware platform 900 includes at least one processor 910 and a memory 905 having instructions stored thereupon. The instructions upon execution by the processor 910 configure the hardware platform 900 to perform the operations described in FIGS. 1 to 8 in the various embodiments described in this patent document. The transmitter 915 transmits or sends information or data to another device. For example, a network device transmitter can send a message to a user equipment. The receiver 920 receives information or data transmitted or sent by another device. For example, a user equipment can receive a message from a network device.

The following clauses reflect features of some preferred embodiments.

Clause 1. A method of wireless communication, comprising: receiving a rank indication or a first index associated with the rank indication, wherein the rank indication is used to determine G rank values, wherein G is a positive integer; receiving a matrix indication or a second index associated with the matrix indication, wherein the matrix indication is used to determine a basic matrix; and determining a precoding matrix for a transmission according to at least one of the G rank values or the basic matrix. In some example embodiments, the foregoing receiving is performed by a wireless device including a user equipment (UE), a mobile station, or wireless mobile node. In some example embodiments, the second index can be same as the first index. In other words, the second index and the first index is an index indicating/associating both rank indication and matrix indication. In some example embodiments, matrix indication is used to determine a basic matrix comprise the case that the basic matrix is indicated directly by matrix indication, or the basic matrix is indicated by not only matrix indication, but also other factors, e.g. size of basic matrix is determined by G rank values, then matrix indication is interpreted under the condition of size of basic matrix. The precoding matrix can also be called as precoder. In some example embodiments, the method further comprises transmitting a signal by precoding according to the precoding matrix. wherein the transmitting a signal is performed by the wireless device in an uplink channel, e.g. PUSCH.

Clause 2. The method of clause 1, further comprising: determining G port groups corresponding to the G rank values, wherein at least one of: each of the G rank values corresponds to a port group, a quantity of ports for each of the G port groups is equal, another quantity of ports in a port group is determined according to the rank indication or the first index, or a sum of quantities of ports in G port groups equals a first quantity of ports of the precoding matrix. For example, assuming number of ports of the precoding matrix as P, number of ports in a port group is P/G. G is the number of port groups which is indicated by the rank indication, equal to the number of rank values. In some example embodiments, for a matrix, sub-matrix, precoding matrix, a row reflects a port, or an antenna port, a column reflects a layer.

Clause 3. The method of clause 1 or 2, wherein a sum of the G rank values is equal to a quantity of layers or columns in the precoding matrix, or a sum of a quantity of ports in the G port groups is equal to a quantity of ports or rows in the precoding matrix.

Clause 4. The method of clause 1 or 2, wherein a size of the basic matrix (i.e. including. a number quantity of rows, $P_b$, or number a quantity of columns, $K_b$) is determined according to at least one of: a value of G, the G rank values, the G port groups, or the first index, a quantity of columns of the basic matrix is determined according to one of the G rank values, a quantity of columns of the basic matrix is determined according to a maximum of the G rank values, a quantity of rows of the basic matrix is determined according to one of G port groups, another quantity of rows of the basic matrix is determined according to a quantity of ports in one of G port groups, a first quantity of rows of the basic matrix is determined according to the value of G, or another second quantity of rows of the basic matrix is determined according to a maximum quantity of ports in G port groups.

Clause 5. The method of clause 1, wherein the determining the precoding matrix according to at least one of the G rank values or the basic matrix, further comprises: determining G sub-matrices for the G port groups according to at least one of the G rank values or the basic matrix, and determining the precoding matrix according to the G sub-matrices.

Clause 6. The method of clause 5, wherein the determining G sub-matrices for the G port groups according to at least one of the G rank values or the basic matrix, further comprises at least one of: determining a sub-matrix for a port group i according to a rank value number $K_i$, of columns of the basic matrix; determining a sub-matrix for a port group i according to a first rank value quantity, of columns of the basic matrix, e.g., according to the index of columns, such as the lowest Ki number of column indexes; determining a sub-matrix for a port group according to a quantity of ports in the port group i, $P_i$, of the basic matrix; determining a sub-matrix for a port group i according to a quantity of ports in the port group, $P_i$, of the basic matrix; or determining a sub-matrix for a port group i according to a quantity of rows of the basic matrix, where the quantity of rows is determined by a quantity of ports in the port group; determining a sub-matrix for a port group i according to a first quantity of rows of the basic matrix, where the quantity of rows is determined by a quantity of ports in the port group; or determining a sub-matrix for a port group is empty or a zero matrix if a rank value of the port group is zero.

Clause 7. The method of clause 6, wherein determining the precoding matrix according to the G sub-matrices, further comprises: determining the precoding matrix according to at least one of the G sub-matrices, a first mapping, or a second mapping, wherein at least one of: the first mapping is used to map a row index in a sub-matrix to a row index in the precoding matrix, the first mapping is used to map a port index in a sub-matrix to a port index in the precoding matrix, the second mapping is used to map a column index in a sub-matrix and a column index in the precoding matrix, the second mapping is used to map a layer index in a sub-matrix and a layer index in the precoding matrix, or the first mapping or the second mapping is predefined, or configured by a base station node or network.

Clause 8. The method of clause 1, further comprising: receiving a pattern indication or a third index associated with the pattern indication, wherein the pattern indication is used to determine non-zero power (NZP) for a port or an element in a sub-matrix for a port group. In some example embodiments, the third index can be same as the first index, or the second index. In other words, the first index, the second index or the third index can be an index indicates/associates with at least one of rank indication, matrix indication, or pattern indication. In some example embodiments, pattern indication can also indicate a port or an element to be zero-power (ZP). NZP can be replaced by NZ, ZP can be replaced by zero.

Clause 9. The method of clause 8, wherein the pattern indication indicates at least one of the following ports, rows, or elements are NZP: all of the ports, elements, or rows in the sub-matrix for the port group, half of the ports, the elements, or the rows in the sub-matrix for the port group, a quarter of the ports, the elements, or the rows in the sub-matrix for the port group, a first half or a second half of the ports, the elements, or the rows in the sub-matrix for the port group, an even index or an odd index of the ports, the elements, or the rows in the sub-matrix for the port group, or a first, a second, a third, or a fourth quarter of the ports, the elements, or the rows in the sub-matrix for the port group.

Clause 10. The method of clause 8, further comprising: the pattern indication is used for a first layer or a first column in a matrix, the pattern indication is used for a layer or a column other than the first layer or the first column in a matrix, or a hopped pattern is used for the layer or the column other than the first layer or the first column in a matrix.

Clause 11. The method of clause 10, wherein the hopped pattern is determined according to at least one of: the pattern indication, or a predefined order.

Clause 12. The method of clause 1, wherein the matrix indication comprises or indicates at least one of: a parameter related to a coherent level, a parameter related to a transmit precoding matrix index (TPMI), a parameter related to a quantity of layers, a parameter related to a second phase offset, a first parameter related to a quantity of horizontal antenna elements on one polarization, e.g., $i_{1,1}$ (related to N1 and/or O1), a second parameter related to a quantity of vertical antenna elements on one polarization, e.g., $i_{1,2}$ (related to N2 and/or O2); a third parameter related to a phase offset, e.g. $i_2$, or a fourth parameter related to an offset of a layer, e.g. $i_{1,3}$. A quantity of layers can be a number of layers of the basic matrix. A parameter of number of layers and TPMI (for a number of Tx equal to the number of ports in a port group) can be used to determine a basic matrix. For example, for a 4-port group, a TPMI for 4-TX (4-port) is indicated for a number of layers for the basic matrix. The parameter related to a number of layers, $i_{11}$, $i_{12}$, $i_2$, and $i_{13}$ can be used to determine a basic matrix. In some example embodiments, a second phase offset is used to enlarge a 4TX matrix, for example, indicated by a 4-TX TPMI, to a 8TX matrix.

Clause 13. The method of clause 12, wherein: at least one of the parameters in the matrix indication is indicated separately for each the G port groups; at least one of the parameters in the matrix indication is indicated commonly for more than one port group of the G port groups; or at least one of the parameters in the matrix indication is indicated commonly for the G port groups.

Clause 14. The method of clause 12, wherein the TPMI comprises coherent level TPMI.

Clause 15. The method of clause 1 or 8, wherein the first index, the second index or the third index is determined according to at least one of: a coherent level of UE, a coherent level of a port group, a coherent level of a panel, a max rank value of a UE, a max rank value of a port group, or a max rank value of a panel. If the coherent level is full coherent, or full and partial and non-coherent, the first/second/third index may comprise the precoding information for coherent level, partial coherent level and non-coherent level. If the coherent level is partial coherent, or partial and non-coherent, the first/second/third index may comprise the precoding information for partial coherent level and non-coherent level. In this case, the first/second/third index may only need to indicate the precoding information for partial coherent level and non-coherent level. And the overhead may be lower. Similarly, if the coherent is non-coherent, the overhead of the first/second/third index may be further lower. The coherent level of UE/port group, or a panel can be configured by NW via RRC signaling or MAC CE, or indicated by a DCI from a NW.

Clause 16. The method of clause 1, or 8, wherein the first index, the second index, the third index, or the rank indication, is determined according to at least one of: a port group indication, a panel mode indication, or an SRS resource set indicator. A panel mode indication indicates at least one active panel which correspond to at least one port group. A SRS resource set indication indicates at least one SRS resource set which corresponds to at least one (scheduled) port group. A port group indication, a panel mode indication or a SRS resource set indicator can indicate at least one port group. The rank indication may comprise the number of the indicated port groups of rank values. A port group indication, a panel mode indication or a SRS resource set indicator can be configured or indicated to UE by NW via RRC signaling, MAC CE, or a DCI.

Clause 17. An apparatus, comprising a processor configured to implement a method recited in any one or more of clauses 1 to 16.

Clause 18. A computer program product having code stored thereon, the code, when executed by a processor, causing the processor to implement a method recited in any one or more of clauses 1 to 16.

Clause 19. A method of wireless communication, comprising: transmitting a rank indication or a first index associated with the rank indication, wherein the rank indication is used to determine G rank values, wherein G is a positive integer; and transmitting a matrix indication or a second index associated with the matrix indication, wherein the matrix indication is used to determine a basic matrix, wherein the transmitting the rank indication or the first index associated with the rank indication and the transmitting the matrix indication or the second index associated with the matrix indication enable a wireless device to determine a precoding matrix for a transmission of data. In some example embodiments, the foregoing transmitting is performed by a network node including a next generation Node B (gNB), a base station, or another network node.

Clause 20. The method of clause 19, wherein a sum of the G rank values is equal to a quantity of layers or columns in the precoding matrix, or a sum of a quantity of ports in the G port groups is equal to a quantity of ports or rows in the precoding matrix.

Clause 21. The method of clause 19, wherein a size of the basic matrix is determined according to at least one of: the G rank values, the G port groups, or the first index, a quantity of columns of the basic matrix is determined according to one of the G rank values, a quantity of columns of the basic matrix is determined according to a maximum of the G rank values, the quantity of rows of the basic matrix is determined according to one of G port groups, another quantity of rows of the basic matrix is determined according to a quantity of ports in one of G port groups, or another quantity of rows of the basic matrix is determined according to a maximum quantity of ports in G port groups.

Clause 22. The method of clause 19, further comprising: transmitting a pattern indication or a third index associated with the pattern indication, wherein the pattern indication is used to determine non-zero power (NZP) for a port or an element in a sub-matrix for a port group.

Clause 23. The method of clause 22, wherein the pattern indication indicates at least one of the following ports rows, or elements are NZP: all of the ports, elements, or rows in the sub-matrix for the port group, half of the ports, the elements, or the rows in the sub-matrix for the port group, a quarter of the ports, the elements, or the rows in the sub-matrix for the port group, a first half or a second half of the ports, the elements, or the rows in the sub-matrix for the port group, an even index or an odd index of the ports, the elements, or the rows in the sub-matrix for the port group, or a first, a second, a third, or a fourth quarter of the ports, the elements, or the rows in the sub-matrix for the port group.

Clause 24. The method of clause 23, further comprising: the pattern indication is used for a first layer or a first column in a matrix, the pattern indication is used for a layer or a column other than the first layer or the first column in a matrix, or a hopped pattern is used for the layer or the column other than the first layer or the first column in a matrix.

Clause 25. The method of clause 19, wherein the matrix indication comprises or indicates at least one of: a parameter related to a coherent level, a parameter related to a TPMI, a parameter related to a quantity of layers, a parameter related to a second phase offset, a first parameter related to a quantity of horizontal antenna elements on one polarization, a second parameter related to a quantity of vertical antenna elements on one polarization; a third parameter related to a phase offset, or a fourth parameter related to an offset of a layer.

Clause 26. An apparatus, comprising a processor configured to implement a method recited in any one or more of clauses 19 to 25.

Clause 27. A computer program product having code stored thereon, the code, when executed by a processor, causing the processor to implement a method recited in any one or more of clauses 19 to 25.

Figure 10:
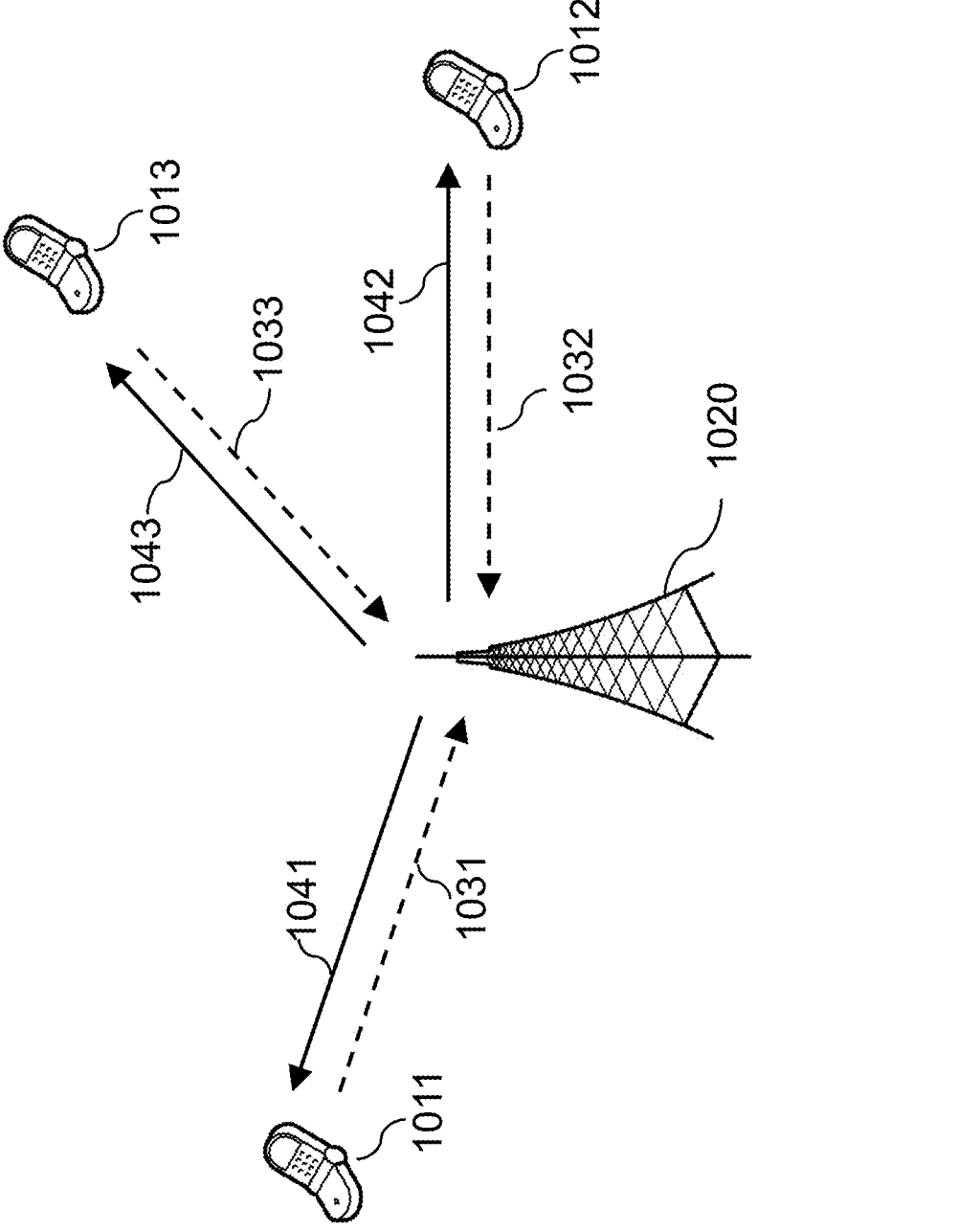
FIG. 10 shows an example of wireless communication including a base station (BS) and user equipment (UE) based on some implementations of the disclosed technology.

The implementations as discussed above will apply to a wireless communication. FIG. 10 shows an example of a wireless communication system (e.g., a 5G or NR cellular network) that includes a base station 1020 and one or more user equipment (UE) 1011, 1012 and 1013. In some embodiments, the UEs access the BS (e.g., the network) using a communication link to the network (sometimes called uplink direction, as depicted by dashed arrows 1031, 1032, 1033), which then enables subsequent communication (e.g., shown in the direction from the network to the UEs, sometimes called downlink direction, shown by arrows 1041, 1042, 1043) from the BS to the UEs. In some embodiments, the BS send information to the UEs (sometimes called downlink direction, as depicted by arrows 1041, 1042, 1043), which then enables subsequent communication (e.g., shown in the direction from the UEs to the BS, sometimes called uplink direction, shown by dashed arrows 1031, 1032, 1033) from the UEs to the BS. The UE may be, for example, a smartphone, a tablet, a mobile computer, a machine to machine (M2M) device, an Internet of Things (IoT) device, and so on.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication comprising:

receiving, by a wireless device from a network node, a rank indication or a first index associated with the rank indication, wherein the rank indication is used to determine G rank values, wherein G is a positive integer greater than or equal to 2;

determining, by the wireless device, G port groups corresponding to the G rank values, wherein each of the G rank values corresponds to a port group of the G port groups;

receiving, by the wireless device from the network node, a matrix indication or a second index associated with the matrix indication, wherein the matrix indication is used to determine a basic matrix, wherein a size of the basic matrix is equal to a number of antenna ports divided by G; and determining, by the wireless device, a precoding matrix for a transmission according to at least one of the G rank values or the basic matrix.

2. The method of claim 1, wherein a sum of the G rank values is equal to a quantity of layers or columns in the precoding matrix, or a sum of a quantity of ports in G port groups corresponding to the G rank values is equal to a quantity of ports or rows in the precoding matrix.

3. The method of claim 1, wherein the determining the precoding matrix according to at least one of the G rank values or the basic matrix comprises:

(a) determining G sub-matrices of the precoding matrix for G port groups according to at least one of the G rank values or the basic matrix, wherein determining the G sub-matrices includes at least one of:

determining a sub-matrix for a port group according to a rank value number of columns of the basic matrix;

determining a sub-matrix for a port group according to a first rank value quantity of columns of the basic matrix;

determining a sub-matrix for a port group according to a quantity of ports in the port group, Pi, of the basic matrix;

determining a sub-matrix for a port group according to a quantity of rows of the basic matrix, wherein the quantity of rows is determined by a quantity of ports in the port group;

determining a sub-matrix for a port group according to a first quantity of rows of the basic matrix, wherein the quantity of rows is determined by a quantity of ports in the port group; or determining a sub-matrix for a port group is empty or a zero matrix if a rank value of the port group is zero; and (b) determining the precoding matrix according to the G sub-matrices.

4. The method of claim 1, further comprising:

receiving, from the network node, a pattern indication or a third index associated with the pattern indication, wherein the pattern indication is used to determine non-zero power (NZP) for a port or the NZP for an element in a sub-matrix of the precoding matrix for a port group.

5. The method of claim 4, wherein the pattern indication indicates at least one of the following ports, rows, or elements are NZP:

all of the ports, elements, or rows in the sub-matrix for the port group, half of the ports, the elements, or the rows in the sub-matrix for the port group, a quarter of the ports, the elements, or the rows in the sub-matrix for the port group, a first half or a second half of the ports, the elements, or the rows in the sub-matrix for the port group, an even index or an odd index of the ports, the elements, or the rows in the sub-matrix for the port group, or a first, a second, a third, or a fourth quarter of the ports, the elements, or the rows in the sub-matrix for the port group.

6. The method of claim 4, wherein:

the pattern indication is used for a first layer or a first column in a matrix, the pattern indication is used for a layer or a column other than the first layer or the first column in a matrix, or a hopped pattern is used for the layer or the column other than the first layer or the first column in a matrix.

7. A method of wireless communication comprising:

transmitting, by a network node to a wireless device, a rank indication or a first index associated with the rank indication, wherein the rank indication is used to determine G rank values, wherein G is a positive integer greater than or equal to 2, and wherein each of the G rank values corresponds to a port group of G port groups; and transmitting, by the network node to the wireless device, a matrix indication or a second index associated with the matrix indication, wherein the matrix indication is used to determine a basic matrix, wherein a size of the basic matrix is equal to a number of antenna ports divided by G, and wherein the transmitting the rank indication or the first index associated with the rank indication and the transmitting the matrix indication or the second index associated with the matrix indication enable the wireless device to determine a precoding matrix for a transmission of data.

8. The method of claim 7, wherein a sum of the G rank values is equal to a quantity of layers or columns in the precoding matrix, or a sum of a quantity of ports in G port groups corresponding to the G rank values is equal to a quantity of ports or rows in the precoding matrix.

9. The method of claim 7, wherein the precoding matrix is determined according to at least one of the G rank values or the basic matrix by:

(a) determining G sub-matrices for G port groups according to at least one of the G rank values or the basic matrix, wherein determining the G sub-matrices includes at least one of:

determining a sub-matrix for a port group according to a rank value number of columns of the basic matrix;

determining a sub-matrix for a port group according to a first rank value quantity of columns of the basic matrix;

determining a sub-matrix for a port group according to a quantity of ports in the port group, Pi, of the basic matrix;

determining a sub-matrix for a port group according to a quantity of rows of the basic matrix, wherein the quantity of rows is determined by a quantity of ports in the port group;

determining a sub-matrix for a port group according to a first quantity of rows of the basic matrix, wherein the quantity of rows is determined by a quantity of ports in the port group; or determining a sub-matrix for a port group is empty or a zero matrix if a rank value of the port group is zero; and (b) determining the precoding matrix according to the G sub-matrices.

10. The method of claim 7, further comprising:

transmitting, to the wireless device, a pattern indication or a third index associated with the pattern indication, wherein the pattern indication is used to determine non-zero power (NZP) for a port or an element in a sub-matrix of the precoding matrix for a port group.

11. The method of claim 10, wherein the pattern indication indicates at least one of the following ports rows, or elements are NZP:

all of the ports, elements, or rows in the sub-matrix for the port group, half of the ports, the elements, or the rows in the sub-matrix for the port group, a quarter of the ports, the elements, or the rows in the sub-matrix for the port group, a first half or a second half of the ports, the elements, or the rows in the sub-matrix for the port group, an even index or an odd index of the ports, the elements, or the rows in the sub-matrix for the port group, or a first, a second, a third, or a fourth quarter of the ports, the elements, or the rows in the sub-matrix for the port group.

12. The method of claim 11, wherein:

the pattern indication is used for a first layer or a first column in a matrix, the pattern indication is used for a layer or a column other than the first layer or the first column in a matrix, or a hopped pattern is used for the layer or the column other than the first layer or the first column in a matrix.

13. An apparatus for wireless communication comprising at least one processor and a memory storing instructions, execution of which by the processor causes the apparatus to:

receive a rank indication or a first index associated with the rank indication, wherein the rank indication is used to determine G rank values, wherein G is a positive integer greater than or equal to 2;

determine G port groups corresponding to the G rank values, wherein each of the G rank values corresponds to a port group of the G port groups;

receive a matrix indication or a second index associated with the matrix indication, wherein the matrix indication is used to determine a basic matrix, and wherein a size of the basic matrix is equal to a number of antenna ports divided by G; and determine a precoding matrix for a transmission according to at least one of the G rank values or the basic matrix.

14. The apparatus of claim 13, wherein a sum of the G rank values is equal to a quantity of layers or columns in the precoding matrix, or a sum of a quantity of ports in G port groups corresponding to the G rank values is equal to a quantity of ports or rows in the precoding matrix.

15. The apparatus of claim 13, wherein the determining the precoding matrix according to at least one of the G rank values or the basic matrix comprises:

(a) determining G sub-matrices of the precoding matrix for G port groups according to at least one of the G rank values or the basic matrix, wherein determining the G sub-matrices includes at least one of:

determining a sub-matrix for a port group according to a rank value number of columns of the basic matrix;

determining a sub-matrix for a port group according to a first rank value quantity of columns of the basic matrix;

determining a sub-matrix for a port group according to a quantity of ports in the port group, Pi, of the basic matrix;

determining a sub-matrix for a port group according to a quantity of rows of the basic matrix, wherein the quantity of rows is determined by a quantity of ports in the port group;

determining a sub-matrix for a port group according to a first quantity of rows of the basic matrix, wherein the quantity of rows is determined by a quantity of ports in the port group; or determining a sub-matrix for a port group is empty or a zero matrix if a rank value of the port group is zero; and (b) determining the precoding matrix according to the G sub-matrices.

16. The apparatus of claim 13, further caused to:

receive a pattern indication or a third index associated with the pattern indication, wherein the pattern indication is used to determine non-zero power (NZP) for a port or the NZP for an element in a sub-matrix for a port group.

17. An apparatus for wireless communication comprising at least one processor and a memory storing instructions, execution of which by the at least one processor causes the apparatus to:

transmit a rank indication or a first index associated with the rank indication, wherein the rank indication is used to determine G rank values, wherein G is a positive integer greater than or equal to 2, and wherein each of the G rank values corresponds to a port group of G port groups; and transmit a matrix indication or a second index associated with the matrix indication, wherein the matrix indication is used to determine a basic matrix, wherein a size of the basic matrix is equal to a number of antenna ports divided by G, and wherein transmitting the rank indication or the first index associated with the rank indication and transmitting the matrix indication or the second index associated with the matrix indication enable a wireless device to determine a precoding matrix for a transmission of data.

18. The apparatus of claim 17, wherein a sum of the G rank values is equal to a quantity of layers or columns in the precoding matrix, or a sum of a quantity of ports in G port groups corresponding to the G rank values is equal to a quantity of ports or rows in the precoding matrix.

19. The apparatus of claim 17, wherein the precoding matrix is determined according to at least one of the G rank values or the basic matrix by:

(a) determining G sub-matrices for G port groups according to at least one of the G rank values or the basic matrix, wherein determining the G sub-matrices includes at least one of:

determining a sub-matrix for a port group according to a rank value number of columns of the basic matrix;

determining a sub-matrix for a port group according to a first rank value quantity of columns of the basic matrix;

determining a sub-matrix for a port group according to a quantity of ports in the port group, Pi, of the basic matrix;

determining a sub-matrix for a port group according to a quantity of rows of the basic matrix, wherein the quantity of rows is determined by a quantity of ports in the port group;

determining a sub-matrix for a port group according to a first quantity of rows of the basic matrix, wherein the quantity of rows is determined by a quantity of ports in the port group; or determining a sub-matrix for a port group is empty or a zero matrix if a rank value of the port group is zero; and (b) determining the precoding matrix according to the G sub-matrices.

20. The apparatus of claim 17, further caused to:

transmit a pattern indication or a third index associated with the pattern indication, wherein the pattern indication is used to determine non-zero power (NZP) for a port or an element in a sub-matrix of the precoding matrix for a port group.

\* \* \* \* \*